United States Patent [19]
Busby

[11] Patent Number: 4,821,103
[45] Date of Patent: Apr. 11, 1989

[54] SOLID STATE IMAGING APPARATUS AND METHOD WITH EXPANDED DYNAMIC RANGE

[75] Inventor: Peter W. Busby, Stevenage, United Kingdom

[73] Assignee: British Aerospace Public Limited Company, London, England

[21] Appl. No.: 39,514

[22] Filed: Apr. 17, 1987

[30] Foreign Application Priority Data

Apr. 29, 1986 [GB] United Kingdom ............... 8610483

[51] Int. Cl.⁴ ............................................. H04N 3/14
[52] U.S. Cl. ....................... 358/213.26; 358/213.19; 358/213.25
[58] Field of Search ................ 358/213.22, 213.23, 358/213.24, 213.25, 213.26, 213.19

[56] References Cited

U.S. PATENT DOCUMENTS

| 3,777,061 | 12/1973 | Takemura | 358/213.25 |
| 4,539,596 | 9/1985 | Elabd | 358/213.24 |
| 4,567,524 | 1/1986 | Levine | 358/213.25 |
| 4,598,321 | 7/1986 | Elabd et al. | 358/213.25 |
| 4,731,656 | 3/1988 | Dischert et al. | 358/213.25 |

FOREIGN PATENT DOCUMENTS 0004735 1/1977 Japan ............................. 358/213.22

Primary Examiner—Jin F. Ng
Assistant Examiner—Stephen Brinich
Attorney, Agent, or Firm—Nixon & Vanderhye

[57] ABSTRACT

Solid state imaging apparatus comprising a charge-coupled frame transfer image sensor including an image-sensitive integration region for forming a charge pattern representative of an incident image, first and second storage regions associated with respective opposed ends of said integration region, and charge transfer means for shifting the charge pattern formed in said integration region into a selected one of said storage regions.

16 Claims, 1 Drawing Sheet

SOLID STATE IMAGING APPARATUS AND METHOD WITH EXPANDED DYNAMIC RANGE

FIELD OF THE INVENTION

This invention relates to solid state imaging apparatus which includes a charge-coupled frame transfer image sensing array.

DESCRIPTION OF THE PRIOR ART

In such sensors, an image is focussed onto a photosensitive area of the device known as the integration region. After a charge integration period comparable with the TV readout field (normally 16.7 or 20 ms), the charge pattern generated by the incident radiation is moved bodily into a storage region by means of parallel column transfer registers and read out line by line via a horizontal readout register. It is known from U.K. Pat. No. 2,083,968 B to vary the integration period to provide a variable sensitivity for the device. According to one arrangement disclosed therein, an image sensor includes a charge drain structure in the form of signal sink means accessible from the column registers in the integration region of the array. During the normal field integration period, charge is integrated, but at a predetermined time dependent on the required sensitivity, the charge pattern in the integration region is shifted at high speed away from the storage region so that the charges spill over the ends of the column registers and become dumped into the device substrate. Having lost this charge, charge is allowed to integrate in the integration region for the remainder of the field period. The integrated charge pattern formed during the remainder of the period is then read out in the normal way. Thus the apparent sensitivity of the CCD is proportional to the length of the remainder of the integration period. Variation in sensitivity may be achieved by an electromechanical iris. It will, however, be understood that a typical scene focussed on the charge-coupled device (CCD) may have a very wide dynamic range, i.e. it may include a wide range of light levels.

Conventional frame transfer charge-coupled devices can have a dynamic range in excess of 60dB, this being the ratio of the maximum number of charges that may be stored in each picture element to the number of noise charges generated in the device and the readout amplifier. In practice, the useful range is severely curtailed by fixed pattern noise due to variations in sensitivity and dark current between individual picture elements. This fixed pattern noise often limits the practical dynamic range to below 40dB.

SUMMARY OF THE INVENTION

According to the invention, there is provided solid state imaging apparatus comprising a charge-coupled frame transfer image sensor including an image-sensitive integration region for forming a charge pattern representative of an incident image, first and second storage regions associated with respective opposed ends of said integration region, and charge transfer means for shifting the charge pattern formed in said integration region into a selected one of said storage regions.

In one embodiment, during each integration period, charge is integrated for a portion of said period and then shifted to one of said storage regions and the charge integrated during the remainder of the period is transferred to the other storage region. In this arrangement the portion may be controllably variable to give a required long and short exposure for the images shifted into the respective storage regions. Also it will be appreciated that, for a sensor operating at a given TV field rage, a long and a short sensitivity image may be obtained for each TV field. The data output from the device may be reconstructed to give a single image with an increased dynamic range. Alternatively, an image of increased dynamic range may be recorded on two conventional video tape recorders of limited dynamic range.

In another embodiment, the apparatus includes charge drain means in said image sensitive integration region, for example an antiblooming structure, and said control means are operable to cause charge accumulated for a predetermined variable portion of said integration period to become lost into said charge drain means. By this arrangement the exposure periods in each TV field may be controlled independently. This arrangement may be used either to provide a series of images having alternately long and short exposures or it may be used to provide a series of images of the same or similar exposure conditions at twice the rate normally achieved from CCD imagers at a given TV field rate.

In a yet further arrangement, the device may be used to observe phenomena in two spectral bands or two planes of polarisation.

DESCRIPTION OF THE DRAWINGS

By way of example only, certain embodiments of this invention will now be described in detail, reference being made to the accompanying drawings in which.

DESCRIPTION OF A PREFERRED EMBODIMENT

Figure 1:
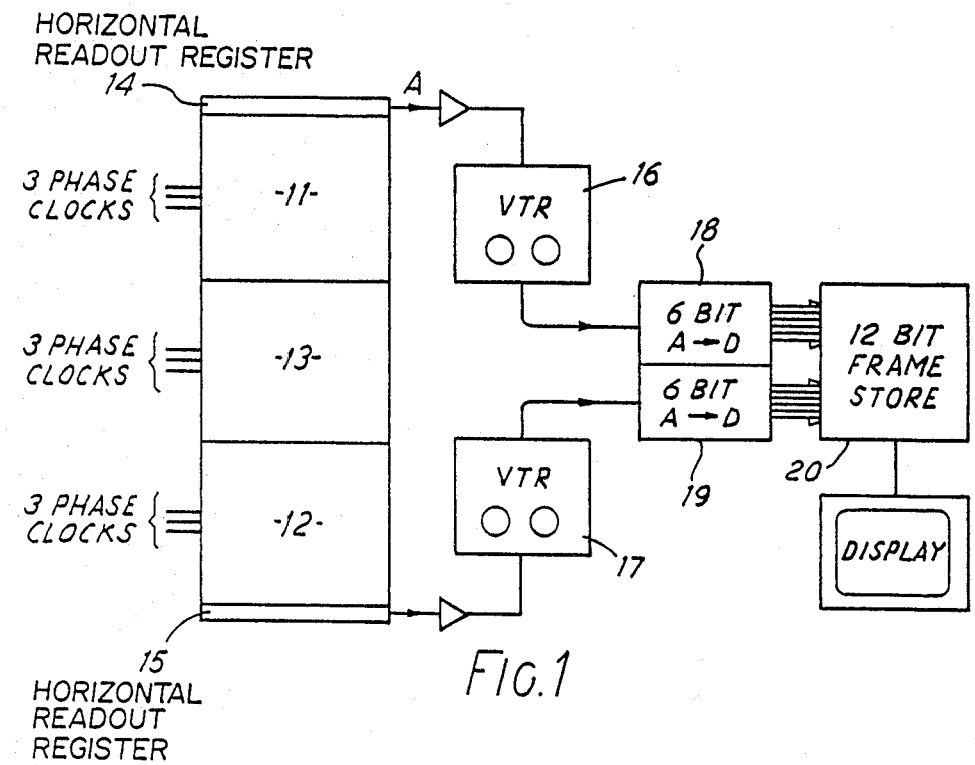
FIG. 1 is a schematic diagram of a CCD frame transfer imager having duel storage regions and configured to allow construction of images of wide dynamic range.

Referring initially to FIG. 1, the device illustrated includes a CCD frame transfer imager 10 having two storage regions 11, 12 provided above and below the imaging (charge integration) region 13. Each of the regions 11, 12 and 13 includes a set of gate electrodes (not shown) and channel stops (not shown) which together define a rectangular array of picture elements. Independent three or four phase clocks (not shown) connected to the gate electrodes control or "clock" the movement of image charge between and within the three regions along the columns defined by the channel stops. The direction of charge movement can be reversed in any region by simply reversing the phase of the electrical clock signals. In operation, a charge pattern of an image focussed on the phtotsensitive integration region 13 is integrated for less than the normal 20 ms TV integration period. The image is then transferred by clocking into the upper storage region 11 and a second charge image integrated for the remaining portion of the TV field; this is then transferred by clocking into the lower storage region 12. The two stored images are simultaneously read out line-by-line during the following TV field via parallel to serial readout registers 14 and 15 for display or recording. The sequence of lines in the TV field readout from store 11 is reversed; this may be rectified on a cathode ray-tube display by reversing the vertical scan coil connections. Alternatively, if the image is stored in a digital frame store, the mode of addressing may be altered to accommodate the reversed line sequence. In an alternative embodiment of the device, the output at A is reconfigured to B and the horizontal register 14 readout in reverse. Two matching images could then be displayed with one TV monitor bodily inverted.

In a particular application, the two image integration periods are adjusted to give one long exposure and one very short exposure. This enables images to be reconstructed with a very wide dynamic range.

It is desirable for the device to have good antiblooming capabilities, which means that, if excess image charge is generated by over exposure, this charge does not spill over and corrupt image charge in adjacent picture elements.

To illustrate a technique according to a preferred embodiment of the invention a particular case will be cited in which two sequential exposures are made on the frame transfer charge-coupled device in the ratio 64:1. This ratio is obtained by choosing the points in each 20 ms TV field that transfers occur into the storage regions 11 and 12. If the time taken to transfer a complete image into one of the storage regions is 0.1 ms then the remaining 19.8 ms should be divided in the ratio 64:1. Thus an integration period of 19.5 ms will be transferred into storage region 11 followed by a further exposure of 0.3 ms which is transferred into storage region 12. The readout from both stores will occur simultaneously in the conventional 19.5 ms active field time of the following TV field. The two output signals may be recorded simultaneously on two video tape recorders 16, 17 which may be replayed in synchronism, either continuously or a single field at a time. It is not feasible to display an image with a very wide dynamic range on a single CRT monitor as both the normal cathode ray tube and the eye are non linear and of limited dynamic range. For the purpose of scientific analysis the two images may be combined in a 12 bit TV frame store 20 as depicted in FIG. 1. The video signals are digitised via two 6 bit analogue to digital converters 18, 19 and the signals amalgamated in the 12 bit frame store 20, the 6 bits of data from each element of storage region 12 (the short exposure) forming the most significant bits. In the cases cited, the CCD imager 10 and/or VTR 16, 17 are used in which the dynamic range need only be 36dB to provide an image with a dynamic range of 72dB.

Figure 2:
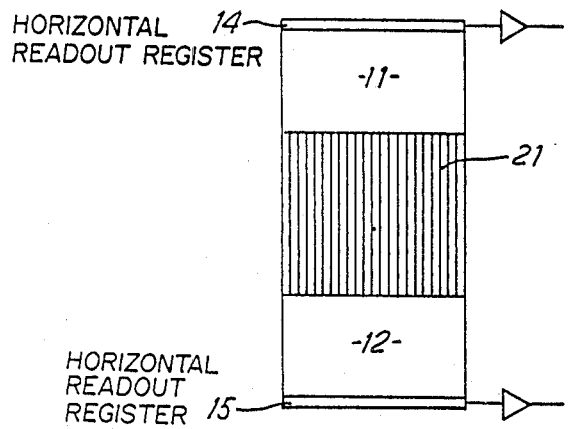
FIG. 2 is a schematic diagram of a CCD frame transfer image with an antiblooming structure.

If the device is constructed with an antiblooming structure 21 such as depicted in FIG. 2, the two exposure periods in each TV field may be controlled independently. An antiblooming structure serves to drain away excess charge which "overflows" from any of the charge integration regions so as to prevent "blooming" of the image in the region of a bright point of the image. The structure may typically comprise charge drains lying between or beneath the charge integration sites. A method of varying the integration period of a conventional frame transfer charge coupled device by purging the integration region of charge is described in U.K. Patent Specification No. 2,083,968 and reference is directed to that specification. The essence of the method is to shorten the exposure period by a precisely controlled amount by reverse clocking the vertical charge transfer registers in the integration region 13 and dumping this charge into a drain diffusion along the periphery of the device. For devices with an integral antiblooming structure 21 within the image charge integration region 13, such as drains lying between or below the charge integration sites, this same technique can be used to shed charge at the interface between the storage and integration regions. Thus in the typical structure depicted in FIG. 2, if the charge coupled clocking mechanism is used to move image charge either upwards or downwards to either storage region, and the charge is not moved in the storage regions, then moving charge will meet a barrier at the interface between the storage region and the integration regions.

Charge will then flow into the antiblooming drains along this interface; this mechanism can be used for purging charge from the integration region as described in U.K. Specification No. 2,083,968.

In a further application of this device, freeze frame image analysis can be achieved at twice the rate normally afforded by a TV system without sacrificing image area. By purging image charge from the integration region prior to an exposure period, allowing charge to accumulate for a short integration period (generally less than 0.5 ms), and then rapidly transferring the image charge into one of the storage regions—a movement freezing snapshot may be taken. The second "snapshot" would normally be taken half a TV field later (10 ms) and stored in the second storage region. Two conventional video tape recorders would record the two output signals for subsequent freeze frame analysis.

The two events recorded in each TV field may also be independently triggered from an external source related to the event. This would allow a critical point in a process to be precisely monitored such as a high speed automated manufacturing plant.

A third application for the CCD device would be to observe phenomena in two spectral bands without the collimation errors that will occur if two imaging means are utilised. In this case a filter wheel containing two spectral filters is rotated in synchronism with the camera at the TV field rate (i.e. 3,000 RPM for the CCIR 50Hz field rate). The exposure periods will be constrained to occur only when each spectral filter is correctly positioned in front of the focal plane. This method may also be utilised to observe phenomena in two planes of polarisation by replacing the spectral filters with polarising filters.

What is claimed is:

1. Solid state imaging apparatus comprising:
   a charge-coupled frame transfer image sensor including:
   an image-sensitive integration region for forming a charge pattern representative of an incident image;
   a first image storage region in charge transfer relationship with one end of said image integration region capable of receiving at least a major part of the charge pattern formed in said integration region and including first storage region signal read-out means,
   and a second image storage region in charge transfer relationship with an opposed end of said image integration region capable of receiving at least a major part of the charge pattern formed in said integration region and including second storage region signal read-out means,
   and charge transfer means for shifting the charge pattern formed on said integration region into a selected one of said image storage regions,
   said imaging apparatus further comprising control means for setting a continuing series of field time periods and for defining in each field time period a long exposure period and a short exposure period and for controlling said charge transfer means to shift the charge pattern integrated during successive long and short exposure periods alternately into said first and second storage regions respectively and for controlling said first storage region signal read-out means and said second region signal read-out means to output data representing a series of long exposure shots and data representing a series of short exposure shots respectively, each series being output at the field rate defined by said field time period.

2. Solid state imaging apparatus according to claim 1, wherein said control means is operable to vary the lengths of the long and short exposure periods.

3. Solid state imaging apparatus according to claim 1, wherein said control means defines within each field time period a long exposure period, a short exposure period, and a further period, and the control means is operable to cause the charge pattern formed during said further period to become lost.

4. Sold state imaging apparatus according to claim 1, wherein said integration region and said first and second storage regions are formed on a common substrate.

5. Solid state imaging apparatus comprising:
a charge-coupled frame transfer image sensor including:
an image-sensitive integration region for forming a charge pattern representative of an incident image;
a first image storage region in charge transfer relationship with one end of said image integration region capable of receiving at least a major part of the charge pattern formed in said integration region and including first storage region signal read-out means,
a second image storage region in charge transfer relationship with an opposed end of said image integration region capable of receiving at least a major part of the charge pattern formed in said integration region and including second storage region signal read-out means,
and charge transfer means for shifting the charge pattern formed on said integration region into a selected one of said image storage regions,
said imaging apparatus further comprising:
control means for setting a continuing series of field time periods and for defining in each field time period a long exposure period and a short exposure period and for controlling said charge transfer means to shift the charge pattern integrated during successive long and short exposure periods alternately into said first and second storage regions respectively, and
means for receiving the outputs from said first and second region signal read-out means and for providing a digital signal in which the output from said first storage region is represented by the least significant digits of said digital signal and the output from said second storage region is representing the most significant bits of said digital signal.

6. Solid state imaging apparatus according to claim 5, wherein said control means is operable to vary the lengths of the long and short exposure periods.

7. Solid state imaging apparatus according to claim 5, wherein said control mans defines within each field time period a long exposure period, a short exposure period, and a further period, and the control means is operable to cause the charge pattern formed during said further period to become lost.

8. Solid state imaging apparatus according to claim 5, wherein said integration region and said first and second storage regions are formed on a common substrate.

9. Solid state imaging apparatus comprising:
a charge-coupled frame transfer image sensor including:
an image-sensitive integration region for forming a charge pattern representative of an incident image;
a first image storage region in charge transfer relationship with one end of said image integration region capable of receiving at least a major part of the charge pattern formed in said integration region and including first storage region signal read-out means,
a second image storage region in charge transfer relationship with an opposed end of said image integration region capable of receiving at least a major part of the charge pattern formed in said integration region and including second storage region signal read-out means,
and charge transfer means for shifting the charge pattern formed on said integration region into a selected one of said image storage regions,
said imaging apparatus further comprising:
control means for setting a continuing series of field time periods and for setting in each field time period a first and second exposure period and for controlling said charge transfer means to shift the charge pattern integrated during said first and said second exposure periods alternately into said first and second storage regions respectively and for controlling said first and second storage region signal read-out means, and
display means for being supplied with the data output from said first and second storage regions and displaying images incident on said image sensor at twice the field rate.

10. Solid state imaging apparatus according to claim 9, wherein said integration region and said first and second storage regions are formed on a common substrate.

11. Solid state imaging apparatus comprising:
a charge-coupled frame transfer image sensor including:
an image-sensitive integration region means for forming a charge pattern representative of an incident image, said integration region means having two opposed ends;
a first image storage region means, in charge transfer relationship with one end of said image integration region means, for receiving at least a major part of said charge pattern formed in said integration region means, said first image storage region means including first storage region signal read-out means; and
a second image storage region means, in charge transfer relationship with an opposed end of said image integration region, for receiving at least a major part of said charge pattern formed in said integration region means, said second image storage region means including second storage region signal read-out means;
charge transfer means for shifting said charge pattern formed on said integration region into a selected one of said first or second image storage region means; and control means for setting a continuing series of field time periods, for defining, in each field time period, a long exposure period and a short exposure period, for controlling said charge transfer means to shift said charge pattern integrated during successive long and short exposure periods alternately into said first and second storage region means, respectively, and for controlling said first storage region signal read-out means and said second storage region signal read-out means to output data representing a series of long exposure shots and data representing a series a short exposure shots, respectively, each series being output at the field rate defined by said field time period.

12. A solid state imaging apparatus according to claim 11, wherein said control means includes means for varying the lengths of said long and short exposure periods.

13. A solid state imaging apparatus according to claim 11, wherein said control means further includes means for defining within each field time period a long exposure period, a short exposure period, and a further period, and said control means further includes means for causing the charge pattern formed during said further period to become lost.

14. A solid state imaging apparatus according to claim 11, wherein said integration region means, first storage region means, and second storage region means are formed on a common substrate.

15. A solid state imaging apparatus comprising a charge-coupled frame transfer image sensor including an image-sensitive integration region for forming a charge pattern representative of an incident image, first and second storage regions associate with respective opposed ends of said integration region, charge transfer means for shifting the charge pattern formed in said integration region into a selected one of said storage regions, control means for defining a continuing series of field time periods and for causing said charge transfer means to shift a charge pattern formed during one portion of said field time period into one of said storage means and to shift the charge pattern formed during another portion of said field time period into the other storage region, wherein said one portion is longer than said another portion, and output processor means for receiving data representations of the charge patterns in each of said storage regions and for processing said data to provide, for each field time period, representative data of extended dynamic range, said output processor means includes means for digitizing data representative of the charge patterns and frame store means of extended dynamic range for storing said image-representative data of extended dynamic range, and wherein the data representative of this charge pattern formed during said one portion of said field time period defines the least significant digits of the continued data and the data representative of the charge pattern formed during said another portion of said field time period defines the most significant digits thereof.

16. Solid state imaging apparatus comprising a charge-coupled frame transfer image sensor including an image-sensitive integration region for forming a charge pattern representative of an incident image, first and second storage regions associated with respective opposed ends of said integration region, charge transfer means for shifting the charge pattern formed in said integration region into a selected one of said storage regions, control means for defining a continuing series of field time periods and for causing said charge transfer means to shift a charge pattern formed during one portion of said field time period into one of said storage regions and to shift the charge pattern formed during another portion of said field time period into the other storage region, wherein said one portion and said another portion are of substantially equal length, and output processor means for displaying images incident on said image sensor at twice the field rate.

* * * * *